(12) United States Patent
Takahashi (10) Patent No.: US 9,915,211 B2
(45) Date of Patent: Mar. 13, 2018

(54) ABNORMALITY DIAGNOSIS DEVICE AND ABNORMALITY DIAGNOSIS METHOD FOR SUPERCHARGER

(71) Applicant: TOYOTA JIDOSHA KABUSHIKI KAISHA, Toyota-shi, Aichi-ken (JP)

(72) Inventor: Machiko Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/321,411

(22) PCT Filed: Jul. 1, 2015

(86) PCT No.: PCT/IB2015/001090
§ 371 (c)(1),
(2) Date: Dec. 22, 2016

(87) PCT Pub. No.: WO2016/005804
PCT Pub. Date: Jan. 14, 2016

(65) Prior Publication Data
US 2017/0159586 A1    Jun. 8, 2017

(30) Foreign Application Priority Data

Jul. 11, 2014    (JP) .................................. 2014-143467

(51) Int. Cl.
*G06F 17/00*    (2006.01)
*F02D 41/00*    (2006.01)
(Continued)

(52) U.S. Cl.
CPC .......... *F02D 41/0007* (2013.01); *F02B 37/18* (2013.01); *F02B 37/183* (2013.01);
(Continued)

(58) Field of Classification Search
CPC .. F02D 41/0005; F02D 41/0007; F02D 41/22; F02D 41/221; F02D 2200/0406; F02D 2200/0408; F02D 2200/602
See application file for complete search history.

(56) References Cited

U.S. PATENT DOCUMENTS

| 4,603,552 A | 8/1986 | Kido |
| 6,224,021 B1 * | 5/2001 | Tanaka .................. B64C 11/305 244/221 |

(Continued)

FOREIGN PATENT DOCUMENTS

| DE | 102005018271 A1 | 10/2006 |
| EP | 1609964 A2 | 12/2005 |

(Continued)

*Primary Examiner* — Hung Q Nguyen
*Assistant Examiner* — Mark L Greene
(74) *Attorney, Agent, or Firm* — Oliff PLC (57) ABSTRACT

The present invention provides an abnormality diagnosis device and an abnormality diagnosis method for a supercharger. In the abnormality diagnosis processing performed by an electronic control unit, a determination of having an abnormality of a turbo charger is made according to the fact that an actual supercharging pressure becomes equal to above the upper-limit supercharging pressure for preventing the over-speed rotation of the turbo charger. The throttle opening is reduced while the output torque of the internal combustion engine is decreased; on the other hand, the actual supercharging pressure is to be decreased by decreasing the rotation speed of the turbo charger. The electronic control unit prohibits the execution of the abnormality determination processing during the reduction of the throttle opening. Thus, a case of making a wrong determination of having the abnormality of the turbo charger through the abnormality diagnosis processing due to the temporary rising of the actual supercharging pressure is suppressed.

7 Claims, 4 Drawing Sheets

(51) Int. Cl.
  *F02D 41/22*   (2006.01)
  *F02B 37/18*   (2006.01)
  *F02B 39/16*   (2006.01)
  *F02D 9/08*    (2006.01)

(52) U.S. Cl.
  CPC .............. *F02B 39/16* (2013.01); *F02D 9/08* (2013.01); *F02D 41/221* (2013.01); *F02D 41/0005* (2013.01); *F02D 2200/0404* (2013.01); *F02D 2200/0406* (2013.01); *Y02T 10/144* (2013.01); *Y02T 10/40* (2013.01)

(56) References Cited

U.S. PATENT DOCUMENTS

| | | | |
|---|---|---|---|
| 7,677,227 B2 * | 3/2010 | Sagisaka | ............... F02B 37/18 123/559.1 |
| 2006/0248889 A1 | 11/2006 | Sagisaka et al. | |
| 2008/0022679 A1 | 1/2008 | Hara et al. | |
| 2015/0308358 A1 * | 10/2015 | Matsumoto | ............ F02B 37/18 60/602 |

FOREIGN PATENT DOCUMENTS

| | | |
|---|---|---|
| JP | S63-50733 A | 3/1988 |
| JP | H03-115756 A | 5/1991 |
| JP | H04-171225 A | 6/1992 |
| JP | 2006-291814 A | 10/2006 |
| JP | 2008-025529 A | 2/2008 |
| JP | 2008-069660 A | 3/2008 |
| JP | 2008-202423 A | 9/2008 |

* cited by examiner

ABNORMALITY DIAGNOSIS DEVICE AND ABNORMALITY DIAGNOSIS METHOD FOR SUPERCHARGER

BACKGROUND OF THE INVENTION

1. Field of the Invention

The present invention relates to an abnormality diagnosis device and an abnormality diagnosis method for a supercharger.

2. Description of Related Art

In an internal combustion engine equipped with a supercharger, an intake air amount and a supercharging pressure of the internal combustion engine are adjusted, so that an output torque thereof is controlled to be a target torque determined by an accelerator operation amount and so on. To be specific, a target intake air amount and a target supercharging pressure of the internal combustion engine can be obtained based on the target torque determined by the accelerator operation amount and so on. Moreover, the opening of a throttle valve and the rotation speed of the supercharger are adjusted in such a way that the intake air amount of the internal combustion engine is controlled to be the target intake air amount and the supercharging pressure of the internal combustion engine is controlled to be the target supercharging pressure.

Further, as shown in the Japanese Patent Application Publication No. 2008-25529 (JP 2008-25529A), an abnormality diagnosis device for determining the presence and absence of an abnormality of the supercharger is disposed in a vehicle equipped with an internal combustion engine having a supercharger. An abnormality determination processing described as follows is executed in this abnormality diagnosis device, that is, comparing an actual supercharging pressure of the internal combustion engine and a prescribed reference value, and determining the presence and absence of an abnormality of the supercharger according to the comparison result. In addition, the above-mentioned actual supercharging pressure is the pressure of a part that is closer to the upstream than the throttle valve and closer to the downstream than the supercharger in the intake passage of the internal combustion engine, and the actual supercharging pressure is detected by a supercharging pressure sensor. Further, for example, the following processing in [A] or [B] can be executed as the abnormality diagnosis processing.

[A] When the actual supercharging pressure is adjusted, an upper-limit supercharging pressure for preventing overspeed rotation of the supercharger is obtained based on the intake air amount of the internal combustion engine and so on, so that the actual supercharging pressure could not rise beyond the upper-limit supercharging pressure. The upper-limit supercharging pressure is set to be the above-mentioned reference value, and it is determined that there is the abnormality of the supercharger according to the fact that the actual supercharging pressure becomes equal to or above the reference value (the upper-limit supercharging pressure).

[B] When the actual supercharging pressure is adjusted, the above-mentioned target supercharging pressure, as an index of the adjustment, is obtained. The target supercharging pressure is set to be the above-mentioned reference value, and it is determined that there is the abnormality of the supercharger according to the fact that the deviation of the actual supercharging pressure with respect to the reference value (the target supercharging pressure) becomes equal to or above a determination value.

However, when the target output torque decreases as the accelerator operation amount operated by the driver is reduced, the target intake air amount will be reduced and the target supercharging pressure will be decreased, so that the output torque of the internal combustion engine is adjusted to be the target output torque. Moreover, the opening of the throttle valve is reduced and the rotation speed of the supercharger is decreased, so that the intake air amount and the actual supercharging pressure of the internal combustion engine are adjusted to be the target intake air amount and the target supercharging pressure respectively.

SUMMARY OF THE INVENTION

However, even if the target intake air amount is reduced and the target supercharging pressure is decreased, decrease of the rotation speed of the supercharger due to this will delay. Moreover, during the period in which the decrease of the rotation speed of the supercharger delays, at the part of the upstream of the throttle valve in the intake passage of the internal combustion engine, air will be supercharged by the supercharger. On the other hand, the opening of the throttle valve (throttle opening) reduces rapidly along with the reduction of the target intake air amount and the decreasing of the target supercharging pressure. Moreover, by reducing the opening of the throttle valve in this way, it is difficult for the air supercharged at the part of the upstream of the throttle valve (the part of the downstream of the supercharger) in the intake passage of the internal combustion engine to flow to the downstream of the throttle valve. As a result, the pressure at the part of the upstream of the throttle valve and the downstream of the supercharger in the intake passage (the actual supercharging pressure) will rise temporarily, and the supercharging pressure which rises temporarily is detected by a supercharging pressure sensor. Therefore, the actual supercharging pressure detected by the supercharging pressure sensor will rise temporarily as described above, and then decrease gradually with the development of the decrease of rotation speed of the supercharger.

During the period in which the decrease of the rotation speed of the supercharger delays, it is possible to make a wrong determination of having the abnormality of the supercharger through the abnormality determination processing while the actual supercharging pressure rises temporarily. That is, in the case of executing the processing in [A] as the abnormality determination processing, when the temporary rising of the actual supercharging pressure occurs, the actual supercharging pressure becomes equal to or above the reference value (the upper-limit supercharging pressure) because the actual supercharging pressure rises beyond the upper-limit supercharging pressure, thus a wrong determination of having the abnormality of the supercharger is made according to such condition. Further, in the case of executing the processing in [B] as the abnormality determination processing, when the temporary rising of the actual supercharging pressure occurs, the above-mentioned actual supercharging pressure will largely deviate to the rising side with respect to the decreased target supercharging pressure. As a result, the deviation of the actual supercharging pressure with respect to the reference value (the target supercharging pressure) will become equal to or above the determination value, and a wrong determination of having the abnormality of the supercharger will be made according to this condition.

In this way, no matter which processing is employed as the abnormality determination processing, either the processing in [A] or the processing in [B], it is possible to make a wrong determination of having the abnormality of the supercharger during the period in which the decrease of the rotation speed of the supercharger delays. In addition, in JP 2008-25529A, a case in which execution of the abnormality determination processing during the decrease of the rotation speed of the supercharger is not permitted is recorded. However, even if such technology is adopted, it is impossible to suppress making a wrong determination of having the abnormality of the supercharger through the abnormality determination processing due to the fact that execution of the abnormality determination processing is also permitted during the period in which the decrease of the rotation speed of the supercharger delays.

The present invention provides an abnormality diagnosis device and an abnormality diagnosis method for the supercharger which can suppress making a wrong determination of having the abnormality of the supercharger through the abnormality determination processing.

The abnormality diagnosis device of one aspect of the present invention includes a supercharger and an electronic control unit, the electronic control unit is configured to: (i) compare an actual supercharging pressure of the internal combustion engine including the supercharger and a prescribed reference value, (ii) execute the abnormality determination processing for determining presence and absence of an abnormality of the supercharger according to the comparison result, and (iii) prohibit the execution of the abnormality determination processing during the reduction of the throttle opening of the internal combustion engine.

When the output torque of the internal combustion engine equipped with the supercharger is decreased, the throttle opening is reduced in order to reduce the intake air amount of the internal combustion engine, on the other hand, the rotation speed of the supercharger is decreased in order to decrease the actual supercharging pressure.

In addition, in the case of adopting, for example, an exhaust gas turbine supercharger as the supercharger, if the flow rate of the exhaust gas from the internal combustion engine bypassing the turbine wheel of the supercharger is increased and the flow rate of the exhaust gas passing through the turbine wheel is decreased, decrease of the rotation speed of the supercharger can be realized. Further, increasing the flow rate of the exhaust gas bypassing the above-mentioned turbine wheel can be realized by, for example, disposing a waste gate valve in the bypass passage through which the bypassed exhaust gas flows and by opening the waste gate valve.

As described above, although the opening of the throttle valve is rapidly reduced while decreasing the output torque of the internal combustion engine, there is delay in decrease of the rotation speed of the supercharger. Therefore, during the period in which the decrease of the rotation speed of the supercharger delays, air will be supercharged by the supercharger at the upstream of the throttle valve in the intake system of the internal combustion engine, and it will become difficult for the air to flow to the downstream of the valve due to the reduction of the throttle opening. Due to this, during the period in which the decrease of the rotation speed of the supercharger delays, the actual supercharging pressure will rise temporarily, and then, after the development of the decrease of the rotation speed of the above-mentioned supercharger, the above-mentioned actual supercharging pressure will decrease.

During the period in which the decrease of the rotation speed of the supercharger delays, when executing the abnormality diagnosis processing for determining the presence and absence of the abnormality of the supercharger according to the result of comparison of the actual supercharging pressure and the above-mentioned reference value, it is possible to make a wrong determination of having the abnormality of the supercharger through the abnormality diagnosis processing due to the fact that the actual supercharging pressure rises temporarily. Therefore, during the reduction of the throttle opening of the internal combustion engine, the execution of the abnormality determination processing performed through the above diagnosis is prohibited. Because the period during which the actual supercharging pressure rises temporarily overlaps the period during which the throttle opening is reduced, it is possible to suppress making a wrong determination of having the abnormality of the supercharger through the abnormality diagnosis processing based on the fact that the actual supercharging pressure rises temporarily, by prohibiting the execution of the abnormality determination processing in the reduction process of the throttle opening.

Further, the following ways can be adopted, that is, the electronic control unit permits the execution of the abnormality determination processing even if the elapsed time from the beginning of the reduction of the throttle opening is equal to or above the determination value during the reduction of the throttle opening of the internal combustion engine. In this case, by setting the determination value to be a value corresponding to the period during which the actual supercharging pressure rises temporarily, it is possible to prohibit the execution of the abnormality determination processing when it is likely to make a wrong determination of having the abnormality of the supercharger, and it is possible to prevent the case where prohibiting the execution of the abnormality determination processing lasts a longer time than required.

In addition, the above-mentioned electronic control unit can set the upper-limit supercharging pressure for preventing the over-speed rotation of the supercharger to be the reference value used in the abnormality determination processing, and can further determine that there is the abnormality of the supercharger based on the fact that the actual supercharging pressure of the internal combustion engine becomes equal to or above the reference value.

Further, the electronic control unit can set the target supercharging pressure, which is used as the target value of the actual supercharging pressure of the internal combustion engine, to be the reference value used in the abnormality determination processing, and the electronic control unit can further determine that there is the abnormality of the supercharger based on the fact that the deviation of the actual supercharging pressure with respect to the reference value is equal to or above the determination value.

The above-mentioned supercharger can be further configured to adjust the rotation speed of the compressor wheel of the supercharger, so that the actual supercharging pressure is consistent with the target supercharging pressure that is variably set. Moreover, when the output torque of the internal combustion engine is decreased, the throttle opening of the internal combustion engine is reduced, and the target supercharging pressure is decreased in order to decrease the actual supercharging pressure. In addition, the reduction of the throttle opening is performed not only when the output torque of the internal combustion engine is decreased, but also is performed in the following conditions.

That is, in order to make the output torque of the internal combustion engine rise with favorable responsiveness, there is the case that, as a stage previous to that, the throttle opening is reduced while the target supercharging pressure is rising. In this case, because it becomes a state that the actual supercharging pressure is raised by raising the target supercharging pressure and that the rising of the output torque of the internal combustion engine is suppressed by the reduction of the throttle opening accompanied therewith, the output torque of the internal combustion engine could rise with a favorable responsiveness if the throttle opening is increased.

Further, in order to confirm the operation of the supercharger, there is also the case where the throttle opening is reduced while raising the target supercharging pressure. In this case, by raising the target supercharging pressure, the actual supercharging pressure is raised because of the operation of the supercharger, and thus, confirmation of the operation of the supercharger is performed. Moreover, the throttle opening is reduced, so as to suppress the rising of the output torque of the internal combustion engine when the actual supercharging pressure is rising due to this confirmation of the operation of the supercharger.

As described above, it is possible to bring about the case that the throttle opening is reduced while raising the target supercharging pressure. In this case, since the operation of the supercharger for making the actual supercharging pressure rise along with the rise of the target supercharging pressure is performed, it is preferable that, the execution of the abnormality determination processing is not prohibited in order to discover the abnormality of the supercharger in advance.

Corresponding to this, even if it is in the reduction process of the throttle opening of the internal combustion engine, when the target supercharging pressure is rising, execution of the abnormality determination processing performed by the diagnosis portion is permitted. Therefore, under the condition of preferably not prohibiting the execution of the abnormality determination processing when reducing the throttle opening while the target supercharging pressure is raised, it can be realized by permitting the execution of the abnormality determination processing as described above.

In addition, the above-mentioned supercharger can be further configured to have supercharging pressure adjusting mechanism which can alter a way in which exhaust gas passes through the turbine wheel by making the exhausting gas of the internal combustion engine pass through the turbine wheel to rotate the compressor wheel, wherein the supercharging pressure adjusting mechanism is configured to adjust the actual supercharging pressure by altering a rotation speed of the compressor wheel. In this case, through the above-mentioned abnormality determination processing, it is possible for determining the presence and absence of the abnormality of the supercharger due to the abnormality of supercharging pressure adjusting mechanism.

Furthermore, the supercharger can further have a structure that rotates a compressor wheel by making exhausting gas of the internal combustion engine pass through a turbine wheel disposed in the exhaust passage, and the supercharger can further include a waste gate valve, which is disposed in a bypass passage which connects a part of an upstream side of the turbine wheel and a part of a downstream side of the turbine wheel in the exhaust passage, and in this case, the actual supercharging pressure is adjusted by alteration of a rotation speed of the compressor wheel due to the operation of the above-mentioned waste gate valve. Moreover, the electronic control unit can determine that there is the abnormality of the supercharger according to the fact that the actual supercharging pressure of the internal combustion engine becomes equal to or above the reference value due to the waste gate valve stuck closed.

Another aspect of the present invention relates to an abnormality diagnosis method for a supercharger using an electronic control unit. The abnormality diagnosis method includes the following process, that is: (i) comparing an actual supercharging pressure of an internal combustion engine including the supercharger and a prescribed reference value, (ii) executing an abnormality determination processing for determining presence and absence of an abnormality of the supercharger according to a comparison result, and (iii) prohibiting the execution of the abnormality determination processing during the reduction of the throttle opening of the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the following, one embodiment of an abnormality diagnosis device of an exhaust gas turbine supercharger is described with reference to FIG. 1 to FIG. 4. In the internal combustion engine 1 illustrated in FIG. 1, a compressor wheel 4a of the exhaust gas turbine supercharger (turbo charger) 4 is disposed in an intake passage 3 connected to a combustion chamber 2. Moreover, at the downstream of the compressor wheel 4a in the intake passage 3, a throttle valve 6 is provided so as to adjust the amount of air supplied to the combustion chamber 2 (the intake air amount) by opening and closing. Air passing through the intake passage 3 is supplied to the combustion chamber 2 of the internal combustion engine 1, and the fuel, the amount of which corresponds to that of the air, is supplied to the combustion chamber 2 by injecting from a fuel injection valve 7. Moreover, a crankshaft 10 as an output shaft of the internal combustion engine 1 is rotated through the reciprocating movement of a piston 8 due to the combustion energy resulted from the burning of the fuel in the combustion chamber 2. In the internal combustion engine 1, by increasing the amount of the air supplied to the combustion chamber 2 and increasing the amount of fuel supplied to the combustion chamber 2 accordingly, the output torque becomes larger.

Figure 1:
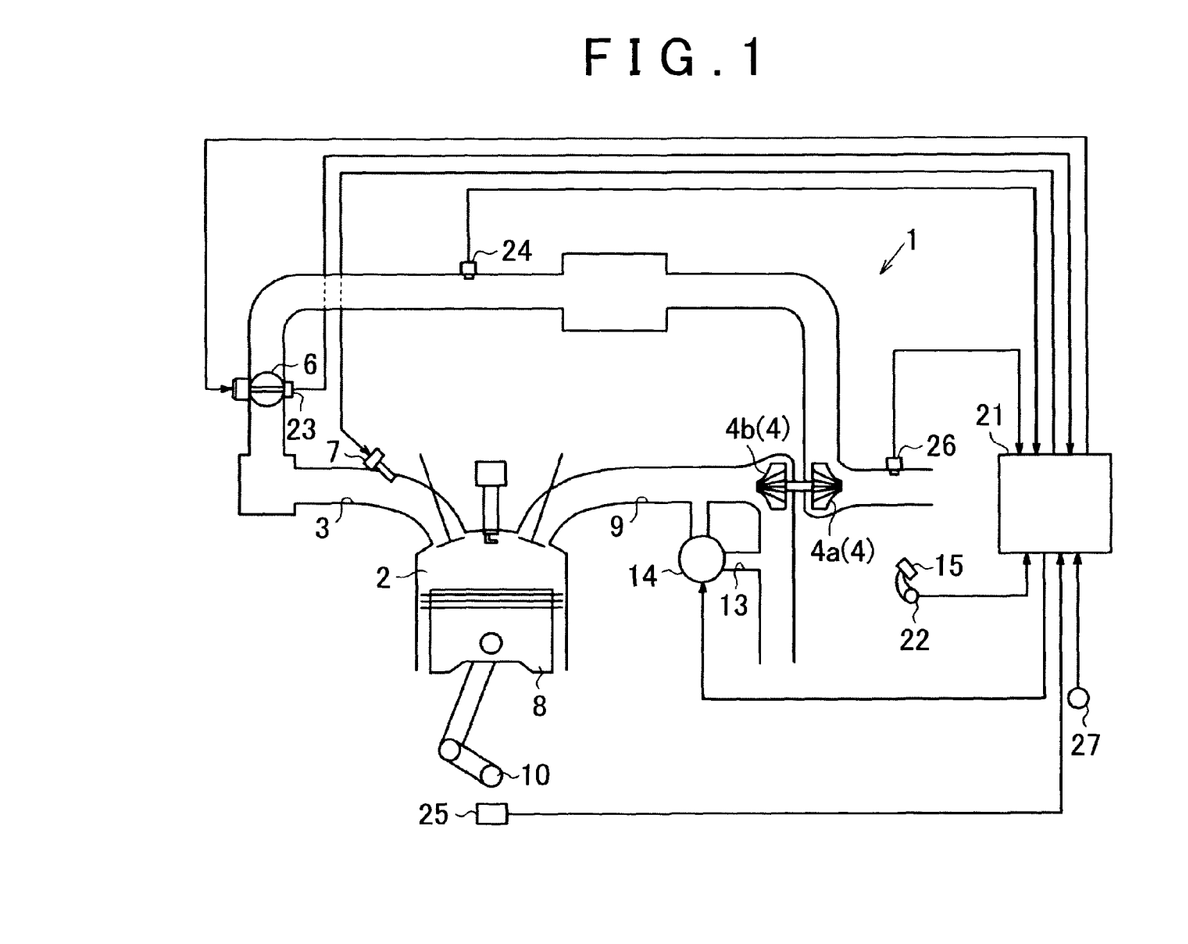
FIG. 1 is an outline illustrating the overall internal combustion engine to which the abnormality diagnosis device of the supercharger is applied.

On the other hand, the exhaust gas produced by fuel burning in the combustion chamber 2 is delivered toward the exhaust passage 9 connected to the combustion chamber 2. A turbine wheel 4b of the turbo charger 4 is provided in the exhaust passage 9. Moreover, by making the exhaust gas flowing through the exhaust passage 9 pass through the turbine wheel 4b, the turbine wheel 4b is rotated, and thus the compressor wheel 4a is rotated together, and therefore, supercharging of the air in the combustion chamber 2 is performed through the rotation of the compressor wheel 4a. In this way, in the internal combustion engine 1 in which the air is supercharged by the turbo charger 4, the pressure at the upstream of the throttle valve 6 in the intake passage 3 (supercharging pressure) is raised as the rotation speed of the turbo charger 4 rises. Moreover, due to the rising of the supercharging pressure, the amount of the fuel and that of the air which can be supplied to the combustion chamber 2 are increased, thus it is possible to raise the output torque of the internal combustion engine 1.

In the internal combustion engine 1, a bypass passage 13 and a waste gate valve 14 are provided, and the bypass passage 13 connects a part at the upstream side and a part at the upstream side of the turbine wheel 4b in the exhaust passage 9, while the opening of the waste gate valve 14 is adjusted so as to make the gas flow area of the bypass passage 13 variable. As the opening of the waste gate valve 14 is increased, the amount of the exhaust gas passing through the turbine wheel 4b is reduced; therefore, the rotation speed of the turbo charger 4 is suppressed to be lower so as to decrease the supercharging pressure of the internal combustion engine 1. On the contrary, as the opening of the waste gate valve 14 is reduced, the amount of the exhaust gas passing through the turbine wheel 4b is increased; therefore, the rotation speed of the turbo charger 4 rises, and the supercharging pressure of the internal combustion engine 1 is raised. Therefore, the waste gate valve 14 functions as a supercharging pressure adjusting mechanism for altering the way in which the exhaust gas passes through the turbine wheel 4b. By the operation of the supercharging pressure adjusting mechanism, the rotation speed of the turbo charger 4 (the compressor wheel 4a) is altered, and then the supercharging pressure of internal combustion engine 1 is adjusted.

Next, an electrical structure of the abnormality diagnosis device for the supercharger is described. The abnormality diagnosis device has an electronic control unit 21 for performing various controls on the internal combustion engine 1. The electronic control unit 21 includes a CPU executing the computation processing related to the above-mentioned various controls, a ROM which stores programs and data required by the controls, a RAM which temporarily stores the computation result of the CPU and so on, input and output ports which input signals from and output signals to the external, and so on.

Various sensors described below and so on are connected to the input port of the electronic control unit 21.

An accelerator position sensor 22 detecting the operation amount of the driver-operated accelerator pedal 15 (an accelerator operation amount) of the vehicle equipped with the internal combustion engine 1.

A throttle position sensor 23 detecting the opening of the throttle valve 6 (the throttle opening).

A supercharging pressure sensor 24 detecting the pressure at the part of the upstream of the throttle valve 6 and at the part of the downstream of the compressor wheel 4a in the intake passage 3.

A crank position sensor 25 detecting the rotation speed of the crankshaft 10 of the internal combustion engine 1.

An intake air temperature sensor 26 detecting the air temperature at the upstream of the compressor wheel 4a in the intake passage 3 (the intake air temperature).

An atmospheric pressure sensor 27 detecting the atmospheric pressure. A driving circuit of the throttle valve 6, a driving circuit of the fuel injection valve 7, and a driving circuit of the waste gate valve 14, and so on are connected to the output port of the electronic control unit 21.

The electronic control unit 21 obtains the required operating state of the internal combustion engine and the actual operating state of internal combustion engine based on the detected signals input from the above various sensors, and outputs command signals to the various driving circuits connected to the above output ports based on these states. In this way, control on the supercharging pressure, control on the throttle opening, and control on the fuel injection amount and so on in the internal combustion engine 1 can be carried out by the electronic control unit 21.

In the internal combustion engine 1 provided with the turbo charger 4, the output torque thereof is controlled by the electronic control unit 21 in the following way. That is, a target output torque To, which is the output torque required by the internal combustion engine 1, is obtained based on the accelerator operation amount detected by the accelerator position sensor 22 and the rotation speed of the internal combustion engine obtained from the detected signal of the crank position sensor 25. Moreover, the target intake air amount GAt and the target supercharging pressure Pt of the internal combustion engine 1 is obtained from the target output torque To. The target supercharging pressure Pt is used as an index (the target value) when adjusting the actual supercharging pressure of the internal combustion engine 1. Moreover, by controlling the intake air amount of the internal combustion engine 1 to be the above-mentioned target intake air amount GAt and controlling the actual supercharging pressure detected by the supercharging pressure sensor 24 to be the above-mentioned target supercharging pressure Pt, adjustments on the opening of the throttle valve 6 and the rotation speed of the turbo charger 4 are executed. In addition, adjustment on the rotation speed of the turbo charger 4 herein is performed by altering the opening of the waste gate valve 14.

On the other hand, the fuel injection amount of the fuel injection valve 7 in the internal combustion engine 1 is performed according to the intake air amount of the internal combustion engine 1 and a target air-fuel ratio. The intake air amount of the internal combustion engine 1 is obtained based on, for example, the actual supercharging pressure, the throttle opening and the rotation speed of the internal combustion engine. Further, the above-mentioned target air-fuel ratio is the target value of the air-fuel ratio when the fuel is burning in the combustion chamber 2 of the internal combustion engine 1, and can be variably set according to the internal combustion engine operating state, such as the accelerator operation amount and the rotation speed of the internal combustion engine. Moreover, the injection amount command value Q, which is the command value of the amount of the fuel injected from the fuel injection valve 7, is calculated according to the intake air amount of the internal combustion engine 1 and the target air-fuel ratio. By driving the fuel injection valve 7 in the manner of injecting the fuel with the amount thereof corresponding to the injection amount command value Q, the fuel whose amount corresponds to the intake air amount is injected from the injection valve 7, and thus the air-fuel ratio of the internal combustion engine 1 is adjusted to be the above-mentioned target air-fuel ratio.

Therefore, when the target output torque To is varied according to the change of the accelerator operation amount operated by the driver, the intake air amount and the actual supercharging pressure and the fuel injection amount are adjusted in the manner of corresponding to the target output torque To at that time, and thus, the output torque of the internal combustion engine 1 can be controlled to be above-mentioned the target output torque To.

In the following, the abnormality determination processing performed by the electronic control unit 21, that is, the abnormality determination processing for determining the presence and absence of an abnormality in the turbo charger 4 including the waste gate valve 14 and so on, will be described in detail. In addition, the electronic control unit 21 functions as a diagnosis portion when executing the abnormality diagnosis processing.

In the abnormality diagnosis processing described above, the actual supercharging pressure of the internal combustion engine 1 and the prescribed reference value are compared, and the presence and absence of the abnormality of the turbo charger 4 is determined according to the comparison result. To be specific, in the internal combustion engine 1 provided with the turbo charger 4, an upper-limit supercharging pressure for preventing over-speed rotation of the turbo charger 4 is set, and the supercharging pressure is adjusted so that the actual supercharging pressure does not rise beyond the upper-limit supercharging pressure. In addition, this upper-limit supercharging pressure can be variably set according to, for example, the intake air amount of the internal combustion engine 1, the intake air temperature, and the atmosphere pressure. Moreover, the upper-limit supercharging pressure is set to be the reference value used in the above-mentioned abnormality determination processing, and it is determined that there is the abnormality of the turbo charger 4 according to the fact that the actual supercharging pressure of the internal combustion engine 1 becomes equal to or above the reference value (the upper-limit supercharging pressure), on the other hand, if it is less than the reference value, it is determined that there is no abnormality of the turbo charger 4. In addition, for instance, an example of the abnormality of the turbo charger 4 with the actual supercharging pressure becoming to be equal to or above the reference value is an abnormality that the waste gate valve 14 is stuck closed.

When the abnormality of the turbo charger 4 (the waste gate valve 14) occurs, problems, including the change of the supercharging pressure characteristics of the turbo charger 4, degradation of the supercharging pressure function due to the over-speed rotation of the turbo charger 4, and so on, will occur. Therefore, when it is determined that there is the abnormality of the turbo charger 4 (the waste gate valve 14) through the above-mentioned abnormality diagnosis processing, the measure to the abnormality is, in consideration of giving the driver a warning indicating the presence of the abnormality, to store the history of the abnormality in the storage portion in the electronic control unit 21. Further, considering performing fail-safe control by the electronic control unit 21, for example, the supercharging pressure control which suppresses the actual supercharging pressure to be close to the decrease side compared with the normal condition, is regarded as a measure to the abnormality.

Figure 2:
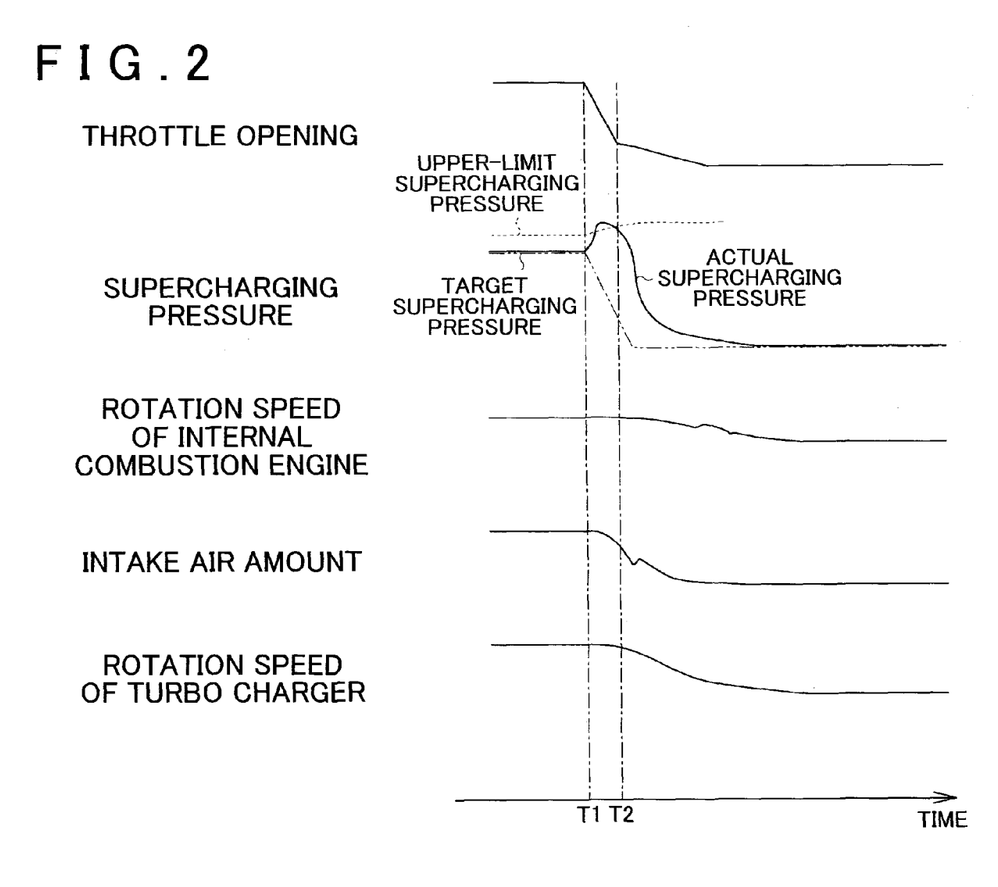
FIG. 2 is a time chart illustrating the changing manners of the throttle opening, supercharging pressure, the rotation speed of the internal combustion engine, the intake air amount, and the rotation speed of the turbo charger, when the accelerator operation amount operated by the driver is reduced.

FIG. 2 is a time chart illustrating the changing manner of the throttle opening, supercharging pressure, the rotation speed of the internal combustion engine, the intake air amount, and the rotation speed of the turbo charger 4, when the accelerator operation amount operated by the driver is reduced.

When the driver reduces the accelerator operation amount at time T1 in the figure, in order to adjust the output torque of the internal combustion engine 1 to be the target output torque To which decreases accordingly, the target intake air amount GAt will be reduced, and as indicated by the double-dot dash line in the graph representing the supercharging pressure in FIG. 2, the target supercharging pressure Pt will decrease as well. Moreover, in order to adjust the intake air amount of the internal combustion engine 1 and the actual supercharging pressure to be the target intake air amount GAt and the target supercharging pressure Pt respectively, the throttle opening is reduced as indicated by the graph representing the throttle opening in FIG. 2, and the opening of the waste gate valve 14 is increased in order to decrease the rotation speed of the turbo charger 4.

However, the actual supercharging pressure is decreased so as to follow the decrease of the target supercharging pressure Pt at this time, thus, even if the rotation speed of the turbo charger 4 is to be decreased by increasing the opening of the waste gate valve 14, there is delay in the decrease of the rotation speed thereof. The period during which the delay in the decrease of the rotation speed of the turbo charger 4 occurs is the period between time T1~T2 in the graph representing the revolution of the turbo charger in the example of FIG. 2. Moreover, in the period (T1~T2) during which the delay in the decrease of the rotation speed of the turbo charger 4 occurs, at the upstream of the throttle valve 6 of the intake system of the internal combustion engine 1, air supercharging is performed by the turbo charger 4. On the other hand, along with the reduction of the above-mentioned target intake air amount GAt and the decrease of the target supercharging pressure Pt, the throttle opening is rapidly reduced as indicated by the graph representing the throttle opening in FIG. 2. Therefore, it is difficult for the air supercharged at the upstream of the throttle valve 6 of the intake system of the internal combustion engine 1 from the turbo charger 4 to flow to the downstream of the throttle valve 6.

Because of these conditions, in the period (T1~T2) during which the decreasing of the rotation speed of the turbo charger 4 delays, the actual supercharging pressure rises temporarily as indicated by the solid line in the graph representing the supercharging pressure in FIG. 2. In this way, the period during which the actual supercharging pressure rises temporarily overlaps the period during which the throttle opening is reduced as indicated by the graph representing the throttle opening in FIG. 2. Then, the above-mentioned actual supercharging pressure is decreased with the development of the decrease in the rotation speed of the turbo charger 4. In addition, in the period during which the decrease of the rotation speed of the above-mentioned turbo charger 4 delays and after this period, the rotation speed and the intake air amount of the internal combustion engine are respectively shifted in the manner, for example, as indicated by the graph representing the rotation speed of the internal combustion engine in FIG. 2 and by the graph representing the intake air amount in FIG. 2.

However, in the period (T1~T2) during which the decreasing of the rotation speed of the above-mentioned turbo charger 4 delays, when the actual supercharging pressure rises temporarily, it is possible to make a wrong determination of having the abnormality of the turbo charger 4 through the abnormality determination processing. Such a wrong determination of having the abnormality of the turbo charger 4 can occur in the following condition, for example.

That is, when the upper-limit supercharging pressure for preventing the over-speed rotation of the turbo charger 4 is variably set according to the intake air amount of the internal combustion engine 1, the intake air temperature and the atmosphere pressure in a manner, for example, as indicated by the dashed line in the graph representing the supercharging pressure in FIG. 2, and the actual supercharging pressure is adjusted to be close to the value of the upper-limit supercharging pressure, there is the condition under which the temporary rising of the actual supercharging pressure (the solid line in the graph representing the supercharging pressure in FIG. 2) occurs. At this time, because the actual supercharging pressure rises beyond the upper-limit supercharging pressure, the actual supercharging pressure is equal to or above the above-mentioned reference value (the upper-limit supercharging pressure) used in the abnormality determination processing, and a wrong determination of having the abnormality of the turbo charger 4 is made based on this condition.

In order to deal with such problem, the electronic control unit 21 prohibits the execution of the abnormality determination processing during the reduction of the throttle opening of the internal combustion engine 1. It can be known from FIG. 2, in the period (T1~T2) during which the decrease of the rotation speed of the turbo charger 4 delays, the period during which the actual supercharging pressure (the solid line in the graph representing the supercharging pressure in FIG. 2) rises temporarily overlaps the period during which the throttle opening (with reference to the graph representing the throttle opening in FIG. 2) is reduced. Due to this, by prohibiting the execution of the above-mentioned abnormality determination processing during the reduction of the throttle opening, it is possible to suppress making a wrong determination of having the abnormality of the turbo charger 4 through the abnormality diagnosis processing due to temporary rise of the above-mentioned actual supercharging pressure.

Figure 3:
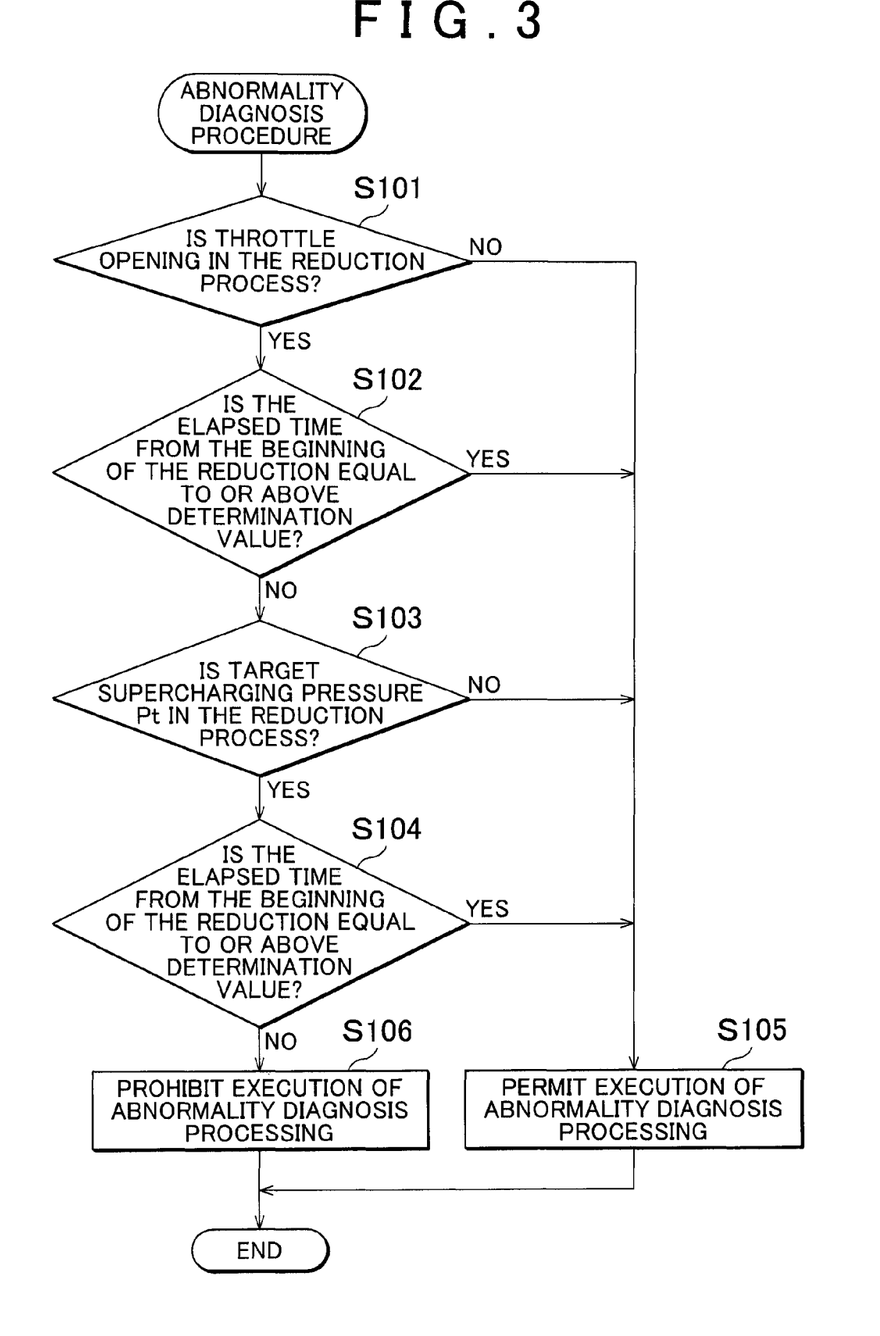
FIG. 3 is a flow chart illustrating the sequence for executing the abnormality determination processing for determining the presence and absence of abnormality of supercharger and prohibiting the execution of the abnormality determination processing.

FIG. 3 is a flow chart illustrating abnormality diagnosis procedure for executing the abnormality determination processing and prohibiting the execution of the abnormality determination processing. This abnormality diagnosis procedure is executed periodically by electronic control unit 21 with timer interruption per predetermined time, for example.

As the process in step 101 (S101) of the abnormality diagnosis procedure, the electronic control unit 21 determines if it is in the reduction process of the throttle opening. In detail, the throttle opening in the abnormality diagnosis procedure executed this time and that in the abnormality diagnosis procedure executed last time are compared, and, it is determined that it is in the reduction process of the throttle opening when the throttle opening for this time is less than that for last time by a value equal to or above the predetermined value.

When a negative determination is made in S101, the flow proceeds to S105. As the processing in S105, the electronic control unit 21 permits the execution of the abnormality diagnosis processing, and then ends the abnormality diagnosis procedure temporarily. On the other hand, when a positive determination is made in S101, the flow proceeds to S102. As the processing in S102, the electronic control unit 21 determines if the elapsed time from the beginning of the reduction of the throttle opening is equal to or above the determination value. In addition, the determination value is preferably set to be a value corresponding to the period during which the temporary rising of the actual supercharging pressure (the solid line in the graph representing the supercharging pressure in FIG. 2) occurs.

When a positive determination is made in S102, the flow also proceeds to S105, and when a negative determination is made in S102, the flow proceeds to S103. As the processing in S103, the electronic control unit 21 determines if it is in the reduction process of the target supercharging pressure Pt. In detail, the target supercharging pressure Pt in the abnormality diagnosis procedure executed this time and the target supercharging pressure Pt in the abnormality diagnosis procedure executed last time are compared, and, it is determined that it is in the reduction process of the target supercharging pressure Pt when the target supercharging pressure Pt for this time is less than the target supercharging pressure Pt for last time by a value that is equal to or above the predetermined value.

When a negative determination is made in S103, the flow also proceeds to S105. When a positive determination is made in S103, the flow proceeds to S104. As the processing in S104, the electronic control unit 21 determines if the elapsed time from the beginning of the reduction of the target supercharging pressure Pt is equal to or above the determination value. In addition, as for the above-mentioned determination value, it can be set to be a value equal to the determination value used in S102, but it can also be set to be a more proper value which is different from the determination value.

When a positive determination is made in S104, the flow also proceeds to S105. When a negative determination is made in S104, the flow proceeds to S106. As the processing in S106, the electronic control unit 21 prohibits the execution of the abnormality diagnosis processing, and then ends the abnormality diagnosis procedure temporarily.

Next, the function of the abnormality diagnosis device of the supercharger will be described. By prohibiting the execution of the abnormality determination processing in the reduction process of the throttle opening, it is possible to suppress making a wrong determination of having the abnormality of the turbo charger 4 by the abnormality diagnosis processing due to the temporary rising of the actual supercharging pressure indicated by the solid line in the graph representing the supercharging pressure in FIG. 2. That is, because the period during which the actual supercharging pressure rises temporarily overlaps the period during which the throttle opening (with reference to the graph representing the throttle opening in FIG. 2) is reduced, if the execution of the abnormality determination processing during the reduction of the throttle opening is prohibited, it is possible to suppress making a wrong determination as described above.

In addition, the execution of the abnormality diagnosis processing is permitted if the elapsed time from the beginning of the reduction of the throttle opening is equal to or above the determination value, even during the reduction of the throttle opening. Therefore, by setting the determination value to be the value corresponding to the period during which the temporary rising of the actual supercharging pressure, indicated by the solid line in the graph representing the supercharging pressure in FIG. 2, occurs, it is possible to prohibit the execution of the abnormality determination processing when it is likely to make a wrong determination of having the abnormality of the turbo charger 4, and, it is possible to prevent the condition in which the time period for prohibiting the execution of the abnormality determination processing is longer than time required.

However, the reduction of the throttle opening in the internal combustion engine 1 is not only performed when the output torque of the internal combustion engine 1 is decreased based on the reduction of the accelerator operation amount by the driver and so on, but is also performed in the following conditions.

That is, when the output torque of the internal combustion engine 1 is to be raised with a favorable responsiveness, there is the case where the target supercharging pressure Pt is raised while the throttle opening is reduced in a previous stage before the output torque rises. In this case, because it is in a state that the actual supercharging pressure is raised by rising the target supercharging pressure Pt and that the rising of the output torque of the internal combustion engine 1 is subsequently suppressed by the reduction of the throttle opening, if the throttle opening is increased, the output torque of the internal combustion engine 1 will rise with a favorable responsiveness.

Figure 4:
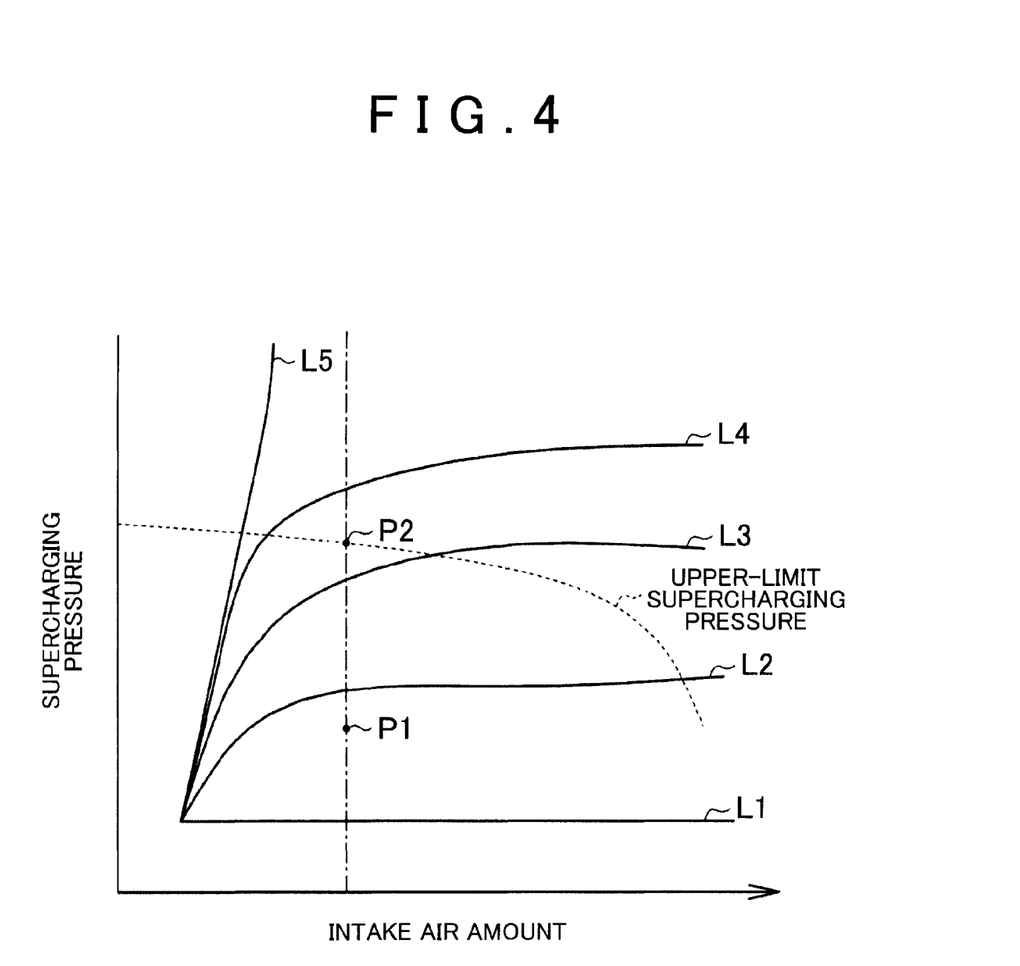
FIG. 4 is a graph illustrating the relation among the opening of the waste gate valve, the supercharging pressure, and the intake air amount.

Further, in order to confirm the operation of the turbo charger 4 (the waste gate valve 14), the waste gate valve 14 acts to be close to full-closed state by rising the target supercharging pressure Pt so that the actual supercharging pressure rises along with the rising of the target supercharging pressure Pt. Moreover, in order to suppress the case that the output torque of the internal combustion engine 1 rises as the actual supercharging pressure rises, the throttle opening is reduced. Moreover, the turbo charger 4 and the waste gate valve 14 act in a manner that the actual supercharging pressure is raised along with the rising of the target supercharging pressure Pt so that the confirmation of these operations is carried out.

FIG. 4 illustrates the relation between the operation of the waste gate valve 14 when confirming the operation and the change of the actual supercharging pressure which occurs subsequent to the operation. In this figure, solid lines L1~L5 represent respectively the relation between the intake air amount and the actual supercharging pressure when the opening of the waste gate valve 14 is adjusted to be the predetermined opening. Moreover, the solid line L1 represents the above-mentioned relation when the waste gate valve 14 is adjusted to be full open, and also represents the above-mentioned relation when the opening of the waste gate valve 14 is reduced as the solid line L1 changes towards the solid lines L2, L3, L4, and L5. In addition, the solid line L5 represents the relation when the waste gate valve 14 is adjusted to be in a full closed state. Further, the dashed line represents the relation between the upper-limit supercharging pressure for preventing over-speed rotation of the turbo charger 4 and the intake air amount.

When the relation between the opening of the waste gate valve 14, the intake air amount and the actual supercharging pressure is in the state indicated by the operation point P1 in the figure, the waste gate valve 14 and the throttle valve 6 act in a manner of shifting the above-mentioned relation from the state indicated by operation point P1 to the state indicated by operation point P2 shown in the figure, so as to perform the confirmation of the operation. That is, by raising the target supercharging pressure Pt in a range in which the rising is not beyond the upper-limit supercharging pressure, the opening of the waste gate valve 14 is adjusted to the full closed side in a way that the actual supercharging pressure rises following the target supercharging pressure Pt. Moreover, the throttle opening is reduced by keeping the intake air amount constant while the actual supercharging pressure at this moment is rising so that the throttle valve 6 acts toward the closing side.

In each of the above examples, the condition in which the throttle opening is reduced while the target supercharging pressure Pt is rising occurs. In this condition, because of the performance of the operation of the turbo charger 4 (the waste gate valve 14) for raising the actual supercharging pressure along with the rising of the target supercharging pressure Pt, preferably, the execution of the determination processing is not prohibited in order to discover the abnormality of the turbo charger 4 in advance.

Corresponding to this, even if it is in the reduction process of the throttle opening of the internal combustion engine 1, when the target supercharging pressure Pt is rising (when a negative determination is made in S103 in FIG. 3), execution of the abnormality determination processing is permitted. Thus, in the condition of preferably not prohibiting the execution of the abnormality determination processing in which the throttle opening is reduced while the target supercharging pressure Pt is raised, it can be implemented by permitting the execution of the abnormality determination processing in the way described above.

According to the present embodiment described above in detail, the following effect can be obtained. (1) by prohibiting the execution of the abnormality determination processing during the reduction of the throttle opening, it is possible to suppress making a wrong determination of having the abnormality of the turbo charger 4 through the abnormality diagnosis processing due to the temporary rising of the actual supercharging pressure.

(2) when an elapsed time from the beginning of the decreasing of the throttle opening is equal to or above a determination value, execution of the abnormality determination processing is permitted, even during the period of decreasing of the throttle opening. Herein, by setting the used determination value to be a value corresponding to the period during which the actual supercharging pressure rises temporarily, it is possible to prohibit the execution of the abnormality determination processing when it is likely to make a wrong determination of having the abnormality of the turbo charger 4, and it is possible to prohibit the time period for prohibiting the execution of the abnormality determination processing lasts a longer time than required.

(3) execution of the above-mentioned abnormality determination processing is permitted, when the target supercharging pressure Pt is rising, even during the reduction of the throttle opening of the internal combustion engine 1. Therefore, it can be implemented by permitting the execution of the abnormality determination processing as described above in the condition of preferably not prohibiting the execution of the abnormality determination processing in which the throttle opening is reduced while the target supercharging pressure Pt is raised. By permitting the execution of the abnormality determination processing, it is possible to deal with the abnormality rapidly based on the determination of having the abnormality in the abnormality determination processing when the abnormality of the turbo charger 4 occurs.

In addition, the embodiment can be altered, for example, in the following way.

In the abnormality determination processing, the target supercharging pressure Pt can be set as the reference value, and the presence and absence of the abnormality of the turbo charger 4 can be determined based on if the deviation with respect to the reference value of the actual supercharging pressure (the target supercharging pressure Pt) is equal to or above the determination value. In this case, it is determined that there is the abnormality of the turbo charger 4 based on the fact that the deviation of the actual supercharging pressure with respect to the reference value is equal to or above the determination value. In addition, as for the above-mentioned determination value, it is considered that it can be prescribed in advance by experiments and so on, so that it becomes the optimum value for determining the presence and absence of the abnormality of the turbo charger 4.

In the case of employing the turbo charger with a variable nozzle as the turbo charger 4, the flow rate of the exhaust gas blew to the turbine wheel 4b can be adjusted by adjusting the opening of the variable nozzle, and the rotation speed of the turbo charger 4 can be altered by adjusting the flow rate, thereby controlling the supercharging pressure. In this case, the above-mentioned variable nozzle functions as a supercharging pressure adjusting mechanism.

Although execution of the abnormality determination processing is permitted when the target supercharging pressure Pt is raising, even during the reduction of the throttle opening of the internal combustion engine 1, it doesn't mean that such processing has to be executed. S103 and S104 in the abnormality diagnosis procedure in FIG. 3 can be omitted when such processing is not executed.

Although execution of the abnormality determination processing is permitted even when an elapsed time from the beginning of the decreasing of the throttle opening is equal to or above a determination value during decreasing of the throttle opening of the internal combustion engine 1, it doesn't mean that such processing has to be executed. S102 in the abnormality diagnosis procedure in FIG. 3 can be omitted when such processing is not executed.

What is claimed is:

1. An abnormality diagnosis device, comprising:
    a supercharger; and
    an electronic control unit that executes computer executable instructions to:
    (i) compare an actual supercharging pressure of an internal combustion engine including the supercharger and a prescribed reference value;
    (ii) execute an abnormality determination processing for determining presence and absence of an abnormality of the supercharger based on a comparison result; and
    (iii) prohibit the execution of the abnormality determination processing during reduction of a throttle opening of the internal combustion engine, wherein,
    the electronic control unit adjusts a rotation speed of a compressor wheel of the supercharger, such that the actual supercharging pressure is consistent with a target supercharging pressure that is variably set, and
    the electronic control unit permits the execution of the abnormality determination processing when the target supercharging pressure is rising, even during the reduction of the throttle opening of the internal combustion engine.

2. The abnormality diagnosis device according to claim 1, wherein,
    the electronic control unit permits the execution of the abnormality determination processing when an elapsed time from beginning of reduction of the throttle opening of the internal combustion engine is above a determination value, even during the reduction of the throttle opening of the internal combustion engine.

3. The abnormality diagnosis device according to claim 1, wherein,
    the electronic control unit sets an upper-limit supercharging pressure for preventing over-speed rotation of the supercharger to be the prescribed reference value used in the abnormality determination processing, and
    the electronic control unit determines that there is the abnormality of the supercharger according to the fact that the actual supercharging pressure of the internal combustion engine becomes equal to or above the prescribed reference value.

4. The abnormality diagnosis device according to claim 3, wherein,
    the supercharger is provided with a structure in which a compressor wheel is rotated by making exhaust gas of the internal combustion engine pass through a turbine wheel provided in an exhaust passage,
    the supercharger includes a waste gate valve, and the waste gate valve is disposed in a bypass passage which connects a part of an upstream side of the turbine wheel and a part of a downstream side of the turbine wheel in the exhaust passage,
    the supercharger is configured to adjust the actual supercharging pressure by alteration of a rotation speed of the compressor wheel due to an operation of the waste gate valve, and
    the electronic control unit determines that there is the abnormality of the supercharger according to the fact that the actual supercharging pressure of the internal combustion engine becomes equal to or above the prescribed reference value due to the waste gate valve stuck closed.

5. The abnormality diagnosis device according to claim 1, wherein,
    the electronic control unit sets the target supercharging pressure as a target value of the actual supercharging pressure of the internal combustion engine, to be the prescribed reference value used in the abnormality determination processing, and
    the electronic control unit determines that there is the abnormality of the supercharger according to the fact that a deviation of the actual supercharging pressure with respect to the prescribed reference value is above a determination value.

6. The abnormality diagnosis device according to claim 1, wherein,
    the supercharger is configured to rotate a compressor wheel by making exhaust gas of the internal combustion engine pass through a turbine wheel,
    the supercharger includes a supercharging pressure adjusting mechanism which alters a way in which the exhaust gas passes through the turbine wheel, and
    the supercharging pressure adjusting mechanism is configured to alter a rotation speed of the compressor wheel so as to adjust the actual supercharging pressure.

7. An abnormality diagnosis method for a supercharger using an electronic control unit, the abnormality diagnosis method comprising:
    (i) adjusting a rotation speed of a compressor wheel of the supercharger, such that an actual supercharging pressure is consistent with a target supercharging pressure that is variably set;
    (ii) comparing the actual supercharging pressure of an internal combustion engine including the supercharger and a prescribed reference value;
    (iii) executing an abnormality determination processing for determining presence and absence of an abnormality of the supercharger according to a comparison result; and
    (iv) prohibiting the execution of the abnormality determination processing during reduction of a throttle opening of the internal combustion engine and when the target supercharging pressure is not rising.

* * * * *